Figure 1:
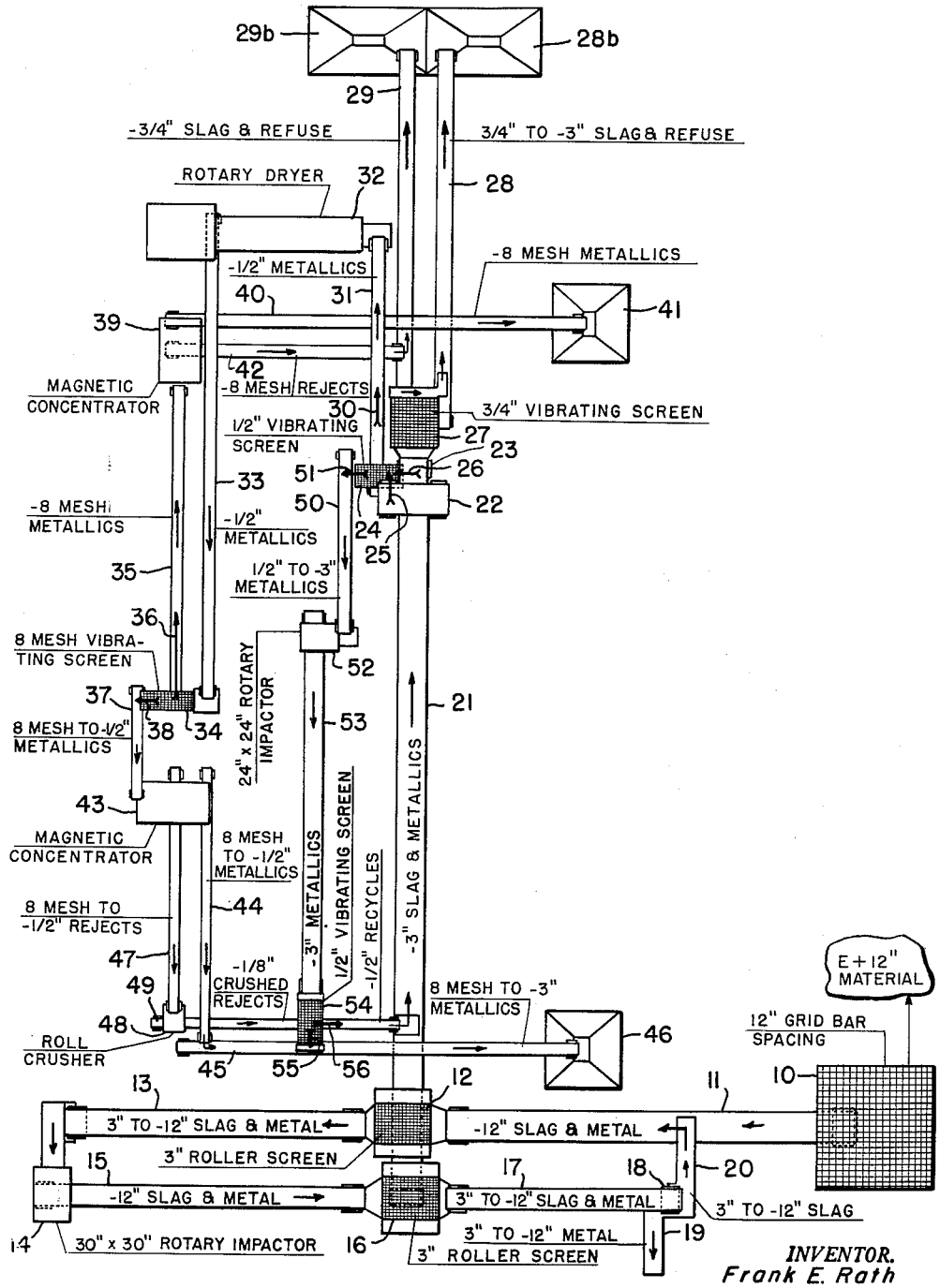

Aug. 14, 1962

F. E. RATH 3,049,305

PROCESS FOR RECOVERING SUBSTANTIALLY CLEAN MAGNETIC
METAL PIECES AND MAGNETIC OXIDES FROM
STEEL PLANT DEBRIS

Filed Feb. 16, 1960

2 Sheets-Sheet 1

INVENTOR.
Frank E. Rath

BY
HIS ATTORNEYS

Aug. 14, 1962    F. E. RATH    3,049,305
PROCESS FOR RECOVERING SUBSTANTIALLY CLEAN MAGNETIC
METAL PIECES AND MAGNETIC OXIDES FROM
STEEL PLANT DEBRIS
Filed Feb. 16, 1960    2 Sheets-Sheet 2

INVENTOR.
Frank E. Rath
BY
Will, Mackey & Burden
HIS ATTORNEYS 3,049,305
Patented Aug. 14, 1962

3,049,305
PROCESS FOR RECOVERING SUBSTANTIALLY CLEAN MAGNETIC METAL PIECES AND MAGNETIC OXIDES FROM STEEL PLANT DEBRIS
Frank E. Rath, Butler, Pa., assignor to Spang & Company, Butler, Pa., a corporation of Pennsylvania
Filed Feb. 16, 1960, Ser. No. 9,024
10 Claims. (Cl. 241—14)

This invention relates to a process for recovering substantially clean magnetic metal pieces and magnetic oxides of a selected size range or size ranges from a burden comprising a mixture of materials such as are found in steel plant debris.

The composition of steel plant debris will vary from day to day but will consist primarily of open hearth slags, open hearth pouring side clean-up material, ladle and furnace lining brick, soaking pit bottom material, rolling mill scale, and some free scrap metal pieces. The open hearth slags will constitute the majority of material to be processed. The mixed debris as discarded by the steel plants has little value for any use except as fill material but certain of the components have an economic value if they can be properly separated and cleaned of contaminants. The total economic value of the discarded material depends not only upon the amount of desirable material separated out from the undesirable debris but also upon the separation of one valuable component from another and the degree of contamination present in the valuable components.

It has thus been an object of my invention to provide a process whereby substantially all of the valuable components of steel plant debris may be recovered in such a manner that they are segregated one from the other and are substantially free of contaminating materials.

With regard to the debris constituents mentioned above, it should be pointed out that open hearth slags are divided into two types according to the function they serve in the open hearth process. The flush or run-off slag is withdrawn from the furnace during the melting and refining process and contains the majority of the impurities driven from the molten metal during the first stages of refining. The tap or finishing slag flows from the furnace after the molten metal is tapped out at the conclusion of the refining process and contains smaller amounts of impurities released by the metal after the flush slag is withdrawn.

The pouring side clean-up materials include mixtures of both tap and flush slags plus a quantity of steel spilled during the course of furnace flushing, furnace tapping and ingot teeming. A small amount of furnace and ladle refractory will be included in this clean-up material. Large amounts of used refractories will be discarded from furnace and ladle rebuilding operations. Depending upon the source of these refractories, they may have substantial amounts of steel or other metallic material adhering to them which is available for recovery.

Soaking pit bottom material consists of the originally placed coke breeze which has been contaminated during pit operation with quantities of scale (iron oxides) from the ingots being heated and in some instances with refractories from the pit itself. In some high temperature soaking pits, the ingots are heated to a temperature which melts or "washes" the exterior of the ingot and this melted steel and oxide mixture becomes included with the discarded bottom material.

During the repeated heating and rolling operations, large quantities of steel are lost in the form of scale. This scale is composed of iron oxides formed when the hot steel is exposed to the oxygen in the air. Scale losses can run as high as 3–5% of ingot weight and scale is removed periodically from soaking pits, slab mill scale boxes, slab heating furnaces, and hot mill scale boxes. It is desired to recover this scale as it has value as an oxidizing agent in the open hearths and as a metallic charge for the blast furnaces.

In connection with the slags, it should be pointed out that tap slag is a dense, magnetic, friable material and generally contains no included metal pieces. In its molten state, it consists mainly of melted limestone in combination with impurities such as phosphorous (calcium phosphates) and silicon (calcium silicates) and dissolved iron oxides. Upon cooling, the dissolved iron oxides tend to concentrate or clump together as the mixture solidifies. This action produces a slag solid which contains portions with a high concentration of iron oxides and other portions containing little or no iron oxides. The portions containing the high concentrations of iron oxides are highly magnetic, contain very little phosphorous or silicon contaminations, and constitute valuable additions to the burden of a blast furnace. Conversely, the portions containing little or no iron oxides are less magnetic and are highly contaminated with phosphorous, silicon, and other impurities which are extremely undesirable in blast furnace operation. If the tap slag is broken up and treated as hereinafter described, the desirable portions containing the majority of the iron oxides can be recovered from the undesirable portions containing the contaminants for reuse in the blast furnaces.

On the other hand, flush slag is non-magnetic, porous and friable but less friable than tap slag. It contains entrapped particles of free steel and has a higher phosphorous content than tap slag. It is desired to recover the free steel by liberating it from the flush slag binder and cleaning it to remove the contaminating high phosphorous slag particles. When a burden containing both tap slag and flush slag is impacted, the relative toughness of the flush slag causes the impacted flush slag particles to be of a larger average size than the impacted tap slag particles.

Prior metal recovery processes are known wherein the as-received burden, containing among other things magnetic tap slag and non-magnetic flush slag, is subjected to magnetic separation. Such procedure is not satisfactory inasmuch as the magnetic separation removes from the burden unclean metal pieces having both types of slag adhering thereto and also removes magnetic tap slag and magnetic oxides making the portion removed a mixed contaminated product, the value of which is much lower than the value of the individual components when considered separately. In accordance with the present invention, however, the as-received burden containing both magnetic and non-magnetic materials is subjected to impaction and size separation of such character as to remove the magnetic slags and oxides from the burden without also removing the metal pieces desired to be recovered. During the impaction, these metal pieces will be rendered substantially free of any contaminating friable material. After the friable magnetic material is removed from the burden by a sizing operation, the remaining burden can be subjected to magnetic separation to separate therefrom the clean magnetic metal pieces.

Thus in practicing my invention I make use of two separate and distinct physical properties (friability and magnetic susceptibility) of the materials being processed to achieve the separation of the valuable components from the remainder of the process burden. Rather than using only the relative magnetic susceptibilities of the different materials to attempt to separate them from each other I combine, in a certain sequence, as described more particularly hereinafter, this magnetic separation with a separation based on the relative friabilities of the materials involved in order to more completely realize the value content of the debris. Not only will more valuable material be recovered from a given amount of debris processed in accordance with my invention but, in addition, these valuable components will be more completely separated from each other and will be less contaminated with undesirable matter.

The steel plant debris in the condition as received from the steel plant can be divided for purposes of consideration into magnetic and non-magnetic material. The magnetic portion can be divided for purposes of consideration into a non-friable portion (the metal pieces to be recovered) and a highly friable portion (the magnetic tap slag).

The non-magnetic portion may also be divided for purposes of consideration into a friable portion and a non-friable portion. Open hearth flush slags and used refractories fall into the class of non-magnetic friable materials. Pieces of non-magnetic metals, i.e., stainless steel, brass and copper, fall into the class of non-magnetic, non-friable materials.

Figure 2:
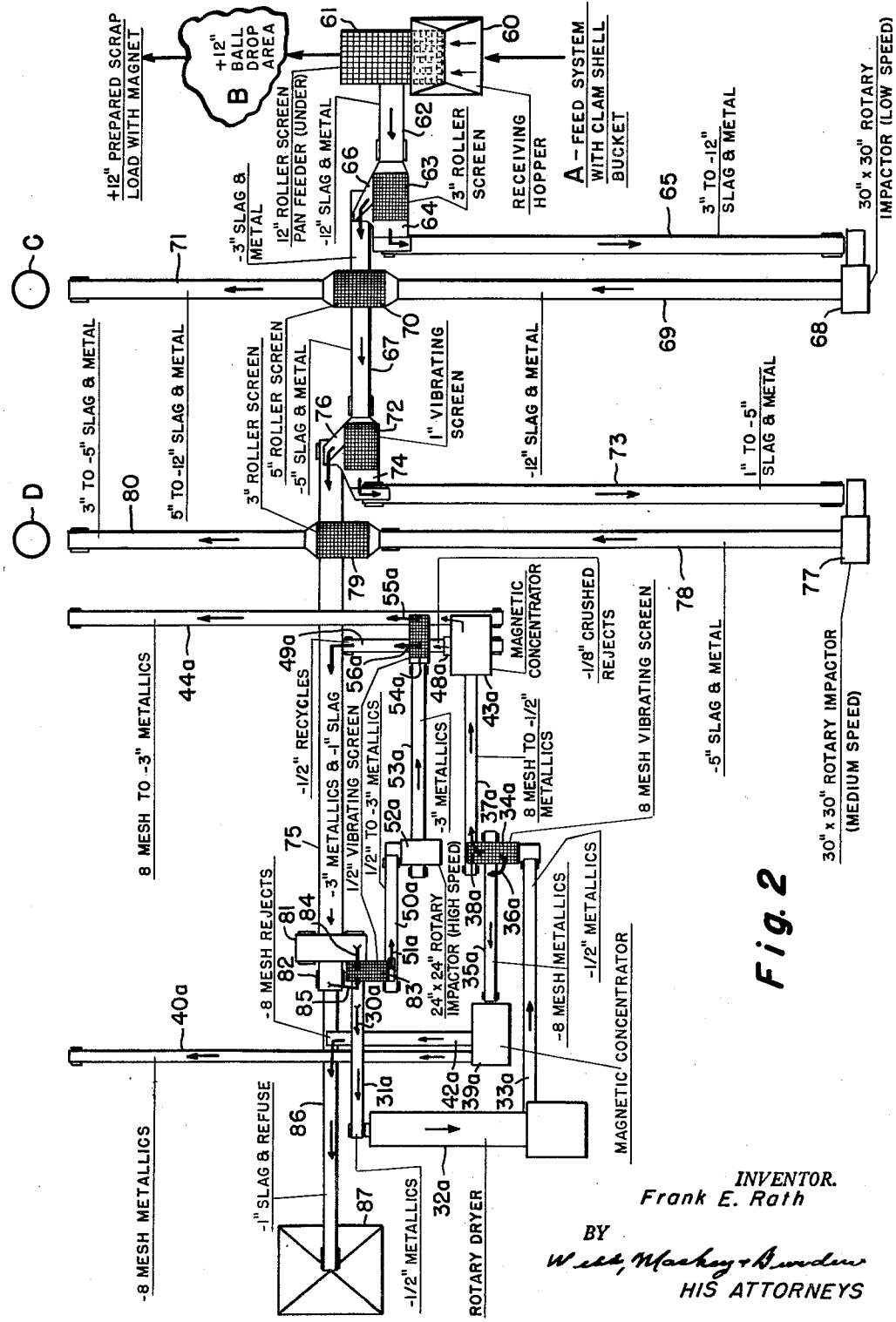

In the accompanying drawings which illustrate two embodiments of my invention,

FIGURE 1 is a schematic plan view of one form of apparatus suitable for carrying out my process; and FIGURE 2 is a similar view of another embodiment.

In accordance with my invention, substantially clean magnetic metal pieces and magnetic oxides of a selected size range or size ranges are recovered from a burden comprising a mixture of materials such as are found in steel plant debris which includes non-friable magnetic material (the metal pieces to be recovered by the process), friable magnetic material (for example, tap slag), friable non-magnetic material (for example flush slag), and non-friable, non-magnetic material (for example, pieces of stainless steel, brass or copper). The burden is impacted with sufficient force to break up all of the friable magnetic material therein to a maximum size which is below the minimum of the selected size range and to render substantially clean the magnetic metal pieces of the selected size range. The impacted burden is then size separated into a smaller piece size portion containing all of the broken-up friable magnetic material and a larger piece size portion containing the substantially clean magnetic metal pieces of the selected size range and some non-magnetic material. The larger piece size portion containing the substantially clean magnetic metal pieces of the selected size range and non-magnetic material is then subjected to magnetic separation to separate out the substantially clean magnetic metal pieces of the selected size range.

As an illustration, if the debris as received from the steel mill is separated into "overs" and "throughs" on a 12" mesh grid, the throughs may consist of the following materials, each in the size range from dust to 12" mesh size; the magnetic metal pieces (non-friable magnetic material), magnetic tap slag (friable magnetic material), non-magnetic flush slag (friable non-magnetic material), refractories (friable non-magnetic material), and brass (non-friable, non-magnetic material). Assuming that a selected size range for the recovery of the substantially clean magnetic metal pieces is from 3" to 12" mesh size, the burden is impacted with sufficient force to break up all of the friable magnetic material therein and some, but not all of the friable non-magnetic material therein to a maximum size which is below 3" mesh size and to render substantially clean the magnetic metal pieces of the size range from 3" to 12" mesh size. Since the flush slag is tougher than the tap slag, the flush slag will not be broken up by the impaction to as great an extent as the tap slag. The maximum mesh size of the impacted flush slag may be, for instance, 6". Certain types of refractories may be affected very little by the impacting and, after impacting, may range from dust to say 8" mesh size.

The burden, after impacting, is size separated into a smaller piece size portion (−3" mesh size) which contains all of the broken-up friable magnetic material and some, but not all of the broken-up friable non-magnetic material and a larger piece size portion containing the substantially clean magnetic metal pieces of a size range between 3" and 12" mesh size and also some non-magnetic material. The size separation of the impacted burden may be accomplished by use of a 3" mesh size screen which separates throughs and overs will then be constituted as follows:

|   | Mesh Size Throughs | Mesh Size Overs |
| --- | --- | --- |
| Magnetic metal pieces | Dust to 3" (unclean) | 3–12" (clean). |
| Magnetic tap slag | Dust to 3" (all) | None. |
| Non-magnetic flush slag | Dust to 3" | 3–6". |
| Refractories | Dust to 3" | 3–8". |

The overs above designated are then subjected to magnetic separation to separate out the substantially clean magnetic metal pieces of the selected size range.

The above example is only for purposes of illustration and the invention is not limited thereto.

It should be pointed out that when I speak of piece size or size ranges in this disclosure, I am not referring directly to any specific dimension of the particle but rather to the size or size range of particles which will pass through a specified screen mesh, roll pass, or opening with equal cross-dimensions (perpendicular to each other). By way of illustration, −3" mesh size material consists of any particles which will pass through a screen or grid having 3" x 3" (perpendicular dimensions) openings on the screening surface even though some of these particles may have a major dimension in excess of 3". A 4" long sliver of metal may properly be included in −3" mesh size material.

Smaller mesh sizes are designated by the number of mesh openings per lineal inch. Thus, an 8 mesh screen would have 8 mesh openings per lineal inch, each opening being somewhat less than 1/8" across.

Reference is now made to the drawings and, more particularly, to FIGURE 1.

The material to be processed is a burden comprising a mixture of materials such as are found in steel plant debris which includes non-friable magnetic material (metal pieces), friable magnetic material (tap slag), friable non-magnetic material (flush slag and refractories), and non-friable, non-magnetic material (pieces of metal such as stainless steel, brass or copper). The burden is deposited upon a grizzly or grid 10 which has a 12" grid bar spacing which allows −12" mesh size material to fall through into a hopper (not shown) and retains +12" mesh size material. The +12" material resting on the grid is impacted by a magnet-carrying crane (not shown) which breaks up most of this +12" material to a −12" mesh size which permits it to fall through the grid into the hopper with the originally passed material. Any +12" mesh size material which is not capable of being broken up by this procedure is sufficiently magnetic to be removed from the grid by the magnet crane to an area E where it is prepared for shipment to the mill.

The −12" mesh size mixed material in the hopper is fed by means of a pan feeder (not shown) to conveyor 11 at a constant rate. Conveyor 11 carries the −12" mesh size burden to 3" mesh size roller screen 12 where it is size separated into overs of 3" to −12" mesh size (the larger piece size portion) and throughs of −3" mesh size (the smaller piece size portion). The overs are conveyed by means of conveyor 13 to rotary impactor 14 where they are impacted with sufficient force to break up all of the friable magnetic portion to a maximum size which is below the minimum of the selected size range (3" to −12" mesh size) and part of the friable non-magnetic portion to a maximum size which is also below the minimum of the selected size range, and to render substantially clean the metal pieces of the selected size range.

The impacted burden is carried by conveyor 15 to roller screen 16 of 3″ mesh size where it is size separated into overs and throughs, the throughs containing all of the broken-up friable magnetic material and part of the broken-up friable non-magnetic material and the overs containing the substantially clean metal of the selected size range and part of the non-magnetic material. The overs from screen 16 are deposited upon belt conveyor 17 which has a magnetic head pulley 18 which separates the material delivered to it into magnetic and non-magnetic portions. The magnetic portion consisting of the substantially clean metal pieces of the selected size is diverted by means of chute 19 into a truck for shipment to the mill or is deposited upon the ground for subsequent delivery. The non-magnetic portion of the impacted and size separated material is unaffected by magnetic head pulley 18 and is diverted by chute 20 to the conveyor 11 for recycling.

The throughs from roller screen 12 and the throughs from roller screen 16 are conveyed by a conveyor 21 to magnetic separators 22 and 23. The magnetic separator 22 is a cross belt magnet device whereas the magnetic separator 23 comprises a magnetic head pulley. The magnetic separator 22 separates magnetic material from the burden on conveyor 21 and delivers the magnetic material so separated onto a ½″ mesh size vibrating screen 24 as shown by arrow 25. The magnetic separator 23 separates magnetic material from the burden on conveyor 21 and also delivers the magnetic material so separated onto the screen 24 as indicated by arrow 26. The non-magnetic material not removed from the burden by the magnetic separators 22 and 23 is delivered onto a ¾″ vibrating screen 27, the overs having a mesh size of ¾″ to 3″ being conveyed by conveyor 28 to a hopper 28b and the throughs having a mesh size of —¾″ being conveyed by conveyor 29 to a hopper 29b.

The throughs from screen 24 (—½″ mesh size) are delivered as indicated by arrow 30 to a conveyor 31 which transports the material thereon through a rotary dryer 32. The material from the dryer 32 is conveyed to a conveyor 33 onto a screen 34 of 8 mesh size. The throughs from screen 34 are delivered onto a conveyor 35 as indicated by arrow 36 and the overs from screen 34 are delivered to a conveyor 37 as indicated by arrow 38. Conveyor 35 delivers the material thereon to a magnetic concentrator 39 which separates the material into a higher magnetic portion and a lower magnetic portion. The higher magnetic portion (—8 mesh size) is conveyed by conveyor 40 from the concentrator to a storage hopper 41. The lower magnetic portion from the concentrator 39 is conveyed by a conveyor 42 to conveyor 29.

The overs from screen 34 are conveyed by conveyor 37 to a magnetic concentrator 43 which separates them into a higher magnetic portion and a lower magnetic portion, the higher magnetic portion being conveyed by a conveyor 44 from the magnetic separator to a conveyor 45 which conveys the material to a storage hopper 46.

The lower magnetic material from the magnetic concentrator 43 is delivered by a conveyor 47 to a roll crusher 48 having a ⅛″ roll pass. The material is conveyed by a conveyor 49 from the roll crusher 48 and is delivered onto the conveyor 21 for recycling.

The overs from screen 24 are delivered to a conveyor 50 as indicated by arrow 51, which conveyor transports the material thereon to a rotary impactor 52. The impacted material from impactor 52 is delivered by a conveyor 53 to a ½″ mesh size vibrating screen 54. The overs from screen 54 pass onto the conveyor 45 as indicated by arrow 55 and are conveyed by conveyor 45 to the hopper 46. The throughs from screen 54 are delivered onto the conveyor 49 as indicated by arrow 56 and are conveyed to conveyor 21 for recycling.

Referring to FIGURE 2, the debris as received from the mill is loaded by clamshell crane A into receiving hopper 60. From hopper 60, the material feeds across roller screen 61 of 12″ mesh size which passes as throughs the debris of —12″ mesh size and discharges as overs the debris of +12″ mesh size which tumbles into ball drop area B. This larger size material is impacted by ball dropping in the ordinary manner to break away any friable materials adhering to the metal and to break up any large size friable pieces which may contain metal. After ball dropping, obviously clean metal of charging box size is picked up by the magnet of the ball dropping crane and loaded for shipment to the open hearth stockhouse. Clean metal too large for open hearth charging is oxygen lanced to charging box size and likewise loaded for shipment. The material remaining in the ball drop area after impacting is recharged into receiving hopper 60 where the majority will be passed as throughs by roller screen 61 to a bin (not shown) to be processed with the previously passed —12″ material.

A pan feeder positioned beneath the outlet of the bin deposits the —12″ mesh size material upon a conveyor 62 at a controlled rate. Conveyor 62 transports the mixed burden to 3″ mesh size roller screen 63 which size separates it into overs and throughs. The overs are directed by chute 64 onto conveyor 65 while the throughs are directed by chute 66 onto conveyor 67. Conveyor 65 transports the overs from screen 63 to rotary impactor 68 which impacts the material with sufficient force to break up all of the friable magnetic portion to a maximum size which is below the minimum of the metal piece size range (5″ to —12″) selected for recovery at this stage and to render substantially clean the metal pieces of the selected size range. The impacting operation also reduces a part of the friable non-magnetic material to a maximum size which is also below the minimum of the selected size range.

The impacted burden from impactor 68 is transported by means of conveyor 69 to 5″ mesh size roller screen 70 where it is size separated into overs and throughs, the throughs containing all of the friable magnetic material of the original burden and a part of the original friable non-magnetic content and the overs containing the substantially clean metal of the selected size range (5″ to —12″) and a part of the original friable non-magnetic content. The overs are conveyed by belt 71 to an area suitable for storage and by means of a chute (not shown) are deposited on the ground.

A magnet-equipped crawler crane (not shown) having a magnet C is employed to separate and load the 5″ to —12″ clean metal for shipment to the mill, leaving the non-magnetic material which was discharged as overs by roller screen 70. This non-magnetic material is trucked away either to a refuse area or recharged into receiving hopper 60 for further impacting, if desired, after inspection for salvageable material.

The throughs from roller screen 70 and the throughs from roller screen 63 are conveyed by belt 67 to screen 72 of 1″ mesh size where they are size separated into overs (1″ to —5″) and throughs (—1″). The overs are deposited upon conveyor 73 by chute 74 and the throughs are directed to conveyor 75 by chute 76. The overs are conveyed by conveyor 73 to rotary impactor 77 where they are impacted with sufficient force to break up all of the friable magnetic portion to a maximum size which is below the minimum of the metal piece size range (3″ to —5″) selected for recovery at this stage and to render substantially clean the metal pieces of the selected size range. A part of the friable non-magnetic material is broken up to a maximum size which is also below the minimum of the selected size range for this stage.

The impacted burden from impactor 77 is transported by conveyor 78 to roller screen 79 of 3″ mesh size where it is size separated into overs and throughs, the throughs containing all of the broken-up friable magnetic material and a part of the broken-up friable non-magnetic material and the overs containing the substantially clean metal of the selected size range (3″ to —5″) and a part of the broken-up friable non-magnetic material. The overs from screen 79 are carried by conveyor belt 80 to a storage area and deposited upon the ground. A magnet-equipped crawler crane (not shown) having a magnet D is employed to separate and load the 3″ to −5″ clean metal for shipment to the mill, leaving the non-magnetic material which was discharged as overs by screen 79. This non-magnetic material remaining after loading may be classed as refuse, hand picked for salvageable material or recharged into receiving hopper 60 for further treatment.

The throughs from vibrating screen 72 (−1″) and the throughs from roller screen 79 (−3″) are carried by conveyor 75 to magnetic separators 81 and 82 for magnetic separation. The magnetic separator 81 is a cross belt magnet device whereas the magnetic separator 82 comprises a magnetic head pulley. The magnetic separator 81 separates magnetic material from the burden on conveyor 75 and delivers the magnetic material so separated onto a screen 83 as shown by arrow 84. The magnetic separator 82 separates magnetic material from the burden on conveyor 75 and also delivers the magnetic material so separated onto the screen 83 as indicated by the arrow 85. The non-magnetic material not removed from the burden by the magnetic separators 81 and 82 is deposited on a conveyor 86 and conveyed to a refuse hopper 87.

The magnetic material on screen 83 is then treated in the same way to magnetically concentrate it as described in connection with the magnetic material on screen 24 of FIGURE 1. Corresponding parts in FIGURE 2 are designated by the same reference numerals with an "a" suffixed.

The apparatus and method described in connection with FIGURE 2 involves the use of two crusher legs, one crusher leg including the screen 63, rotary impactor 68 and screen 70, and the other crusher leg including the screen 72, the rotary impactor 77 and the screen 79. Where the quantity of steel plant debris to be processed does not warrant the initial investment required for a plant such as disclosed in FIGURE 2, a plant comprising a single crusher leg, i.e., a screen 12, a rotary impactor 14 and a screen 16, can be employed. Such a plant, with a single crusher leg, is shown in FIGURE 1.

In FIGURE 1, two 80-ton refuse hoppers 28b and 29b are provided to store ¾″ to 3″ and −¾″ slag and refuse respectively. As will be noted, roller screen 12 is of 3″ pass size so that any portion of the original burden which is below a 3″ mesh size will not be sent to the impactor 14 for treatment but instead will be diverted immediately for magnetic separation by magnets 22 and 23. The magnetic portion will be separated out and delivered to screen 24 and thereafter be subjected to magnetic concentration as previously explained, while the non-magnetic portion will be sized by screen 27 to provide non-magnetic portions of the two size ranges which are stored in the refuse hoppers 28b and 29b. In some areas, these non-magnetic, sized particles are valuable as an aggregate for construction purposes and represent a saleable product without further processing. The −8 mesh magnetic rejects from magnetic concentrator 39 and the non-magnetic portion of the −½″ recycles from roll crusher 48 are also delivered to these bins as well as the non-magnetic portions of the −3″ material passing through screen 16 after impacting in impactor 14. With a layout as shown in FIGURE 1, the processed material evolves into five classifications: from chute 19, the clean magnetic metal of 3″ to −12″ size range which is suitable for direct charging into an open hearth; into hopper 46 is deposited the 8 mesh to −3″ size range metallics and oxides suitable for direct charging into a blast furnace; in hoppers 28b and 29b, the previously mentioned sized aggregate; and into hopper 41, the −8 mesh metallics and oxides which are suitable for charging into a blast furnace after sintering or agglomerating. In addition, any metal above 12″ piece size is reclaimed from grid 10 and lanced, if necessary, to provide 12″ to "charging box" size metal for direct reuse in the open hearth.

In FIGURE 2, the layout is shown for an installation where no market exists for sized aggregate so the primary consideration is given to recovering as much metal as possible. The capacity of the plant shown in FIGURE 2 is also greater than that shown in FIGURE 1 by virtue of the fact that the first impactor in FIGURE 2 is required to clean metal in the 5″ to 12″ range whereas the range is expanded to 3″ to 12″ in FIGURE 1. This narrower range shown in FIGURE 2 allows more material to be fed per hour giving the plant a higher capacity. Whereas in FIGURE 1 the non-magnetic slags are left untreated below 3″ to provide the saleable sized aggregate, in FIGURE 2 the impactor 77 is fed all material from 1″ to −5″ from screen 72 in order to recover any metallics or oxides present in the 1″ to −5″ piece size range.

With the arrangement as shown in FIGURE 2, six classes of product evolve. From the ball drop area B, clean metal of a size between 12″ and "charging box" for direct recharging into the open hearth; at the area of magnet C, clean metal of a size between 5″ and 12″ suitable for open hearth charging; at the area of magnet D, clean metal between 3″ and 5″ mesh size to be recharged into the open hearth; at the discharge end of conveyor 44a, 8 mesh to 3″ metallics and oxides suitable for direct reuse in a blast furnace; at the discharge end of conveyor 40a, −8 mesh metallics and oxides suitable for blast furnace charge material after sintering; and in hopper 87, the −1″ slag and refuse which is wasted or otherwise disposed of.

The rotary impactors, i.e., the impactors 14 and 52 of the apparatus as shown in FIGURE 1 and the impactors 68, 77 and 52a as shown in FIGURE 2, are all of the same type as the rotary impactors which are more fully described in applicant's copending application Serial No. 739,823 (now Patent 2,971,703).

The invention is not limited to the preferred embodiments but may be otherwise embodied or practiced within the scope of the following claims.

I claim:

1. A process for recovering substantially clean magnetic metal pieces and magnetic oxides of a selected size range from a burden comprising a mixture of materials such as are found in steel plant debris which includes magnetic metal pieces, friable magnetic material, friable non-magnetic material and non-friable, non-magnetic material, which comprises impacting the burden with sufficient force to break up all of the friable magnetic material therein and some, but not all of the friable non-magnetic material therein to a maximum size which is below the minimum of the selected size range and to render substantially clean the magnetic metal pieces of the selected size range, size separating the impacted burden into a smaller piece size portion containing all of the broken-up friable magnetic material and some, but not all of the friable non-magnetic material therein and a larger piece size portion containing the substantially clean magnetic metal pieces of the selected size range and some friable non-magnetic material, and subjecting the larger piece size portion containing the substantially clean magnetic metal pieces of the selected size range and some friable non-magnetic material to magnetic separation to separate out the substantially clean magnetic metal pieces of the selected size range from the friable non-magnetic material.

2. A process for recovering substantially clean magnetic metal pieces and magnetic oxides of a selected size range from a burden comprising a mixture of materials such as are found in steel plant debris which includes magnetic metal pieces, friable magnetic material, friable non-magnetic material and non-friable, non-magnetic material, which comprises separating the burden by a sizing operation into a larger piece size part and a smaller piece size part, impacting the larger piece size part with sufficient force to break up all of the friable magnetic material therein and some, but not all of the friable non-magnetic material therein to a maximum size which is below the minimum of the selected size range and to render substantially clean the magnetic metal pieces of the selected size range, size separating the impacted burden into a smaller piece size portion containing all of the broken-up friable magnetic material and some, but not all of the friable non-magnetic material therein and a larger piece size portion containing the substantially clean magnetic metal pieces of the selected size range and some friable non-magnetic material, and subjecting the larger piece size portion containing the substantially clean magnetic metal pieces and some friable non-magnetic material to magnetic separation to separate out the substantially clean magnetic metal pieces of the selected size range from the friable non-magnetic material.

3. A process for recovering substantially clean magnetic metal pieces and magnetic oxides in progressively smaller piece size ranges from a burden comprising a mixture of materials such as are found in steel plant debris which includes magnetic metal pieces, friable magnetic material, friable non-magnetic material and non-friable, non-magnetic material, which comprises impacting the burden with sufficient force to break up all of the friable magnetic material therein and some, but not all of the friable non-magnetic material therein to a maximum size which is below the minimum of a selected piece size range and to render substantially clean the magnetic metal pieces of the selected piece size range, size separating the impacted burden into a smaller piece size portion containing all of the broken-up friable magnetic material and some, but not all of the friable non-magnetic material therein and a larger piece size portion containing the substantially clean metal pieces of the selected size range and some friable non-magnetic material, subjecting the larger piece size portion containing the substantially clean metal pieces of the selected size range and some friable non-magnetic material to magnetic separation to separate out the substantailly clean magnetic metal pieces of the selected size range from the friable non-magnetic material, and subjecting the smaller piece size portion containing the broken-up friable magnetic material to the defined steps of impacting, size separating and magnetic separation to provide burden of smaller size range and to separate therefrom substantially clean magnetic metal pieces of smaller size range.

4. A process for recovering substantially clean magnetic metal pieces and magnetic oxides in progressively smaller piece size ranges from a burden comprising a mixture of materials such as are found in steel plant debris which includes magnetic metal pieces, friable magnetic material, friable non-magnetic material and non-friable, non-magnetic material, which comprises separating the burden by a sizing operation into a larger piece size part and a smaller piece size part, impacting the larger piece size part with sufficient force to break up all of the friable magnetic material therein and some, but not all of the friable non-magnetic material therein to a maximum size which is below the minimum of a selected piece size range and to render substantially clean the magnetic metal pieces of the selected piece size range, size separating the impacted larger piece size part into a smaller piece size portion containing all of the broken-up friable magnetic material and some, but not all of the friable non-magnetic material therein and a larger piece size portion containing the substantially clean metal pieces of the selected size range and some friable non-magnetic material, subjecting the larger piece size portion containing the substantially clean metal pieces of the selected size range and some friable non-magnetic material to magnetic separation to separate out the substantially clean magnetic metal pieces of the selected size range from the friable non-magnetic material, and subjecting the smaller piece size portion containing the broken-up friable magnetic material and said smaller piece size part to the defined steps of size separating, impacting, size separating and magnetic separation to provide burden of smaller size range and to separate therefrom substantially clean magnetic metal pieces of smaller size range.

5. A process according to claim 1, wherein said smaller piece size portion is subjected to magnetic separation.

6. A process according to claim 5, wherein the remainder of the larger piece size portion from which the substantially clean magnetic metal pieces of the selected size range have been separated is subjected to the defined steps of impacting, size separating and magnetic separation to recover further values therefrom.

7. A process according to claim 2, wherein said smaller piece size part and said smaller piece size portion are subjected to magnetic separation.

8. A process according to claim 7, wherein the remainder of the larger piece size portion from which the substantially clean magnetic metal pieces of the selected size range have been separated is subjected to the defined steps of size separating, impacting, size separating and magnetic separation to recover further values therefrom.

9. A process according to claim 3, wherein the final smaller piece size portion is subjected to magnetic separation.

10. A process according to claim 4, wherein the final smaller piece size portion and the final smaller piece size part are subjected to magnetic separation.

References Cited in the file of this patent
UNITED STATES PATENTS

| | | |
|---|---|---|
| 772,377 | Rowland et al. | Oct. 18, 1904 |
| 1,458,387 | Bourne | June 12, 1923 |
| 1,617,971 | Ullrich | Feb. 15, 1927 |
| 2,264,204 | Heckett | Nov. 25, 1941 |
| 2,352,712 | Heckett | July 4, 1944 |
| 2,721,035 | Lankford et al. | Oct. 18, 1955 |
| 2,726,815 | Heckett | Dec. 13, 1955 |
| 2,971,703 | Rath | Feb. 16, 1961 |

FOREIGN PATENTS

| | | |
|---|---|---|
| 956,826 | Germany | Jan. 24, 1957 |

OTHER REFERENCES

Magnetic Separation in Ore Dressing, by W. H. Dennis, Mine and Quarry Engineering, September 1944, pages 223–225.

UNITED STATES PATENT OFFICE
CERTIFICATE OF CORRECTION

Patent No. 3,049,305                              August 14, 1962

Frank E. Rath

It is hereby certified that error appears in the above numbered patent requiring correction and that the said Letters Patent should read as corrected below.

Column 4, line 5, after "separates" insert -- the burden supplied to it into throughs and overs. The --; column 5, line 39, for "conveyed to" read -- conveyed by --; column 9, line 43, for "substantailly" read -- substantially --.

Signed and sealed this 4th day of December 1962.

(SEAL)
Attest:

ERNEST W. SWIDER
Attesting Officer

DAVID L. LADD
Commissioner of Patents